(12) United States Patent
Vangala et al.

(10) Patent No.: US 10,726,438 B2
(45) Date of Patent: Jul. 28, 2020

(54) PERSONALIZED CONTEXTUAL COUPON ENGINE

(71) Applicant: MICROSOFT TECHNOLOGY LICENSING, LLC, Redmond, WA (US)

(72) Inventors: Vipindeep Vangala, Hyderabad (IN); Prashant Bhugra, Hyderabad (IN); Nirav Kamdar, Hyderabad (IN); John Michael Guthmann, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 631 days.

(21) Appl. No.: 15/044,942

(22) Filed: Feb. 16, 2016

(65) Prior Publication Data

US 2017/0068982 A1    Mar. 9, 2017

(51) Int. Cl.
*G06Q 30/00*    (2012.01)
*G06Q 30/02*    (2012.01)
*G06Q 50/12*    (2012.01)

(52) U.S. Cl.
CPC ......... *G06Q 30/0224* (2013.01); *G06Q 50/12* (2013.01)

(58) Field of Classification Search
None
See application file for complete search history.

(56) References Cited

U.S. PATENT DOCUMENTS

| | | | |
|---|---|---|---|
| 2002/0174011 A1* | 11/2002 | Sanchez | G06Q 20/387 705/14.25 |
| 2009/0156234 A1* | 6/2009 | Sako | G01C 21/3614 455/456.3 |
| 2009/0276304 A1* | 11/2009 | Dorr | G06Q 20/20 705/14.14 |
| 2013/0185126 A1* | 7/2013 | Stefanescu | G06Q 30/0213 705/14.13 |
| 2014/0032678 A1* | 1/2014 | Koukoumidis | G06F 17/30867 709/205 |
| 2015/0186535 A1* | 7/2015 | Patil | G06F 3/04817 707/710 |
| 2015/0294339 A1* | 10/2015 | Vargas | G06Q 30/0215 705/14.17 |
| 2016/0358211 A1* | 12/2016 | Huang | G06Q 30/0255 |
| 2017/0017968 A1* | 1/2017 | Bhattacharjee | G06Q 30/0201 |
| 2017/0148046 A1* | 5/2017 | Akbarpour Mashadi | G06Q 30/0239 |

* cited by examiner

*Primary Examiner* — Alvin L Brown
(74) *Attorney, Agent, or Firm* — Shook, Hardy & Bacon LLP

(57) ABSTRACT

Aspects of the technology described herein provide a more efficient user interface by providing coupons that are tailored to a specific user's interests. The coupons may be provided by a personal assistant or some other application running on a user's computing device. A goal of the technology described herein is to provide relevant coupons when the user can and actually wants to use them. The coupons are designed for goods or services the user intends to purchase.

20 Claims, 8 Drawing Sheets

PERSONALIZED CONTEXTUAL COUPON ENGINE

CROSS REFERENCE TO RELATED APPLICATIONS

This application claims priority to Indian Patent Application having Application No. 4657/CHE/2015, filed in India on Sep. 3, 2015, entitled "PERSONALIZED CONTEXTUAL SUGGESTION ENGINE," the entirety of which is hereby incorporated by reference.

BACKGROUND

A personal assistant program provides services traditionally provided by a human assistant. For example, a personal assistant can update a calendar, provide reminders, track activities, shop for the user, and perform other functions. Some personal assistant programs can respond to voice commands and audibly communicate with users. Personal assistants can suggest restaurants, music, tasks, movies, and other items to a user when the user might have an interest in one of these items. Personal assistants can analyze signal data to determine a user's current context.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a more efficient user interface by providing coupons that are tailored to a specific user's present shopping interests. The coupons may be provided by a personal assistant, web browser, or some other application running on a user's computing device. A goal of the technology described herein is to provide relevant coupons when the user can and actually wants to use them. For example, the coupon could be provided when the user is shopping online and visits an online store. Similarly, the coupon could be presented as the user approaches a bricks-and-mortar shopping location. The coupons are for services the user wants to use or goods the user wants to buy.

In one aspect, relevant coupons and the appropriate time to present the coupons can be determined by association rules. The association rules are generated by analyzing a user's past actions and the actions of other users to determine a probability the user is interested in a coupon in a given context. The technology described herein can analyze signals describing user actions to build data vectors associated with different types of events. For example, different types of data vectors may describe a movie event, a music event, a travel event, a dinning event, a shopping event, etc. The data vectors are then used as input to a machine learning algorithm to generate association rules. In one aspect, the user can receive the same coupon whether in store or online.

Once generated, the current context of a user can be monitored to trigger a coupon associated with the association rule when the context part of the association rule matches the current context.

The technology described herein can provide an application program interface (API) that allows vendors to add coupons to the coupon platform. The platform can then distribute the coupons to the user according to criteria provided by the vendors. The vendors can be retailers of goods or services or providers (e.g., manufacturers) of goods or services.

BRIEF DESCRIPTION OF THE DRAWINGS

Aspects of the technology described in the present application are described in detail below with reference to the attached drawing figures, wherein.

DETAILED DESCRIPTION

Figure 1:
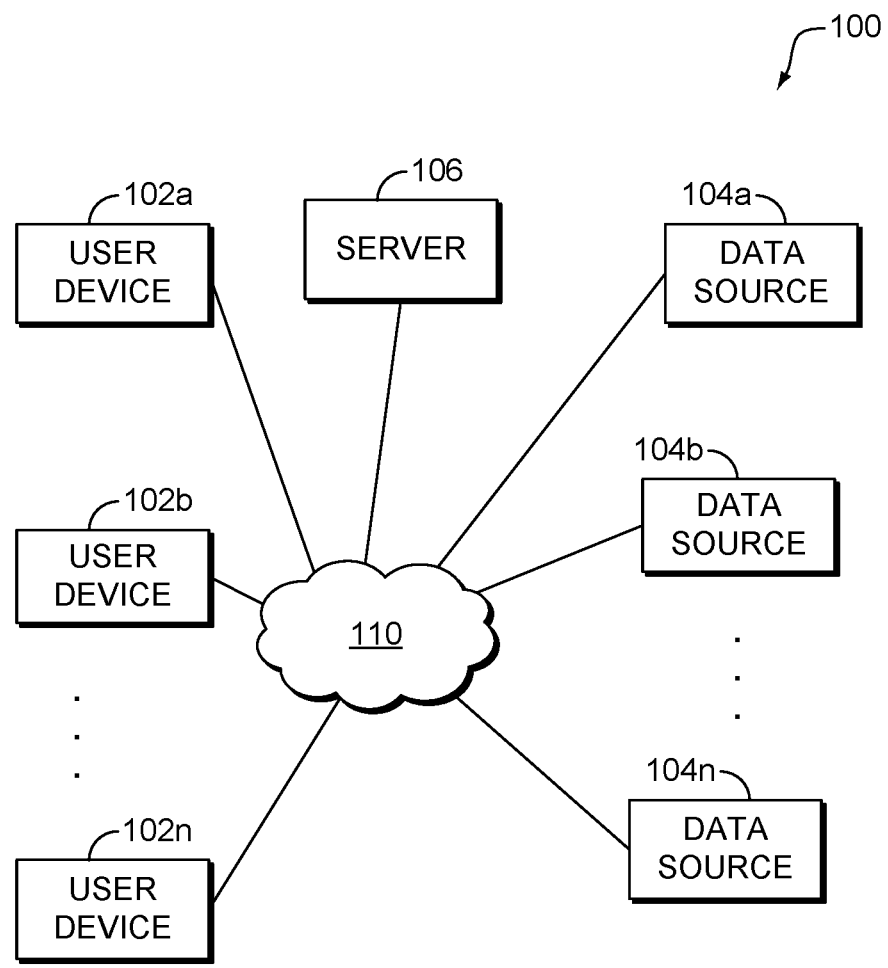
FIG. 1 is a block diagram of an example operating environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a more efficient user interface by providing coupons that are tailored to a specific user's present shopping interests. The coupons may be provided by a personal assistant, web browser, or some other application running on a user's computing device. A goal of the technology described herein is to provide relevant coupons when the user can and actually wants to use them. For example, the coupon could be provided when the user is shopping online and visits an online store. Similarly, the coupon could be presented as the user approaches a bricks-and-mortar shopping location. The coupons are for services the user wants to use or goods or services the user wants to buy. The goods or services may be described as a "shopping item" herein.

The coupon can take the form of a deal or discount offer that is currently active for a good or service for all users. For example, a store may have a 20% off sale on all winter clothing. In this case, the coupon serves as notice, but is not required to receive the sale price. In an aspect, the user must present the coupon to receive the discount. An online store may require the user to enter a coupon code on a check-out screen. For an in-store purchase, a coupon displayed on a smartphone could be shown to a store clerk. The displayed coupon could have a bar code, QR code, or other identification that can be captured by an automated scanner.

The coupons may be provided when the user's context indicates a possible interest in the coupon. The "possible interest" is derived from previous activity patterns and possibly activity patterns of other people. For example, a coupon for dog food may be provided upon the user entering a pet store after not having purchased dog food for four weeks. The context can be a time, place, and/or situation where the user has previously purchased dog food. For example, the user may have previously purchased dog food when at the pet store (location). Further, the user could have a pattern of purchasing dog food (at one or more locations) every four weeks (time context). The time context can be important because the user may not be interested in a dog food coupon every time the user enters a store that sells dog food. Upon determining that the present context of the user is at the pet store, the coupon for dog food may be surfaced to the user. Other types of coupons can involve travel options, entertainment options, dining options, and such depending on context.

Presentation of the coupons can be triggered based on an association rule. The association rule represents a user behavior pattern. Each user can have personalized association rules, even for the same coupon. For example, a coupon for dog food can be triggered for a user when the user is at the pet store and for a second user when the user navigates to an online store that sells dog food. The technology described herein analyzes user activity to determine when the user might be interested in a specific coupon. The association rule associates a user context with a coupon. The context can be multivariable. For example, the context could be a physical location, virtual location, time, and day. The coupon can be a user-specific coupon or a class of coupon. The class of coupon may take the form of a template to which data can be added to form a coupon presented to the user. The interest in a coupon can be learned from analyzing user behavior patterns to generate personalized coupons.

The association rule, in effect, assigns a probability that the user is interested in the coupon given a specific context. Different users can have different probabilities associating the specific context and the coupon. The probability in the association rule can be determined with a machine learning algorithm that analyzes the user's previous activities. The machine learning algorithm can also take into account the activities of a plurality of users to build association rules. In such a scenario, the user-specific data may be given more weight than the general data when calculating a probability for an association rule.

Aspects of the technology described herein collect user activity data that may be relevant to an association rule. In one aspect, the relevant information can be stored within data vectors that describe a specific activity or event engaged in by the user. For example, a music purchase event that describes the user purchasing music can include various vector components, such as the genre of music purchased, the time the music was purchased, the user's location when purchasing the music, in addition to other information. Each part of the information may form a value for a component in the data vector. For example, a first component of the data vector may define a time for the event. The value associated with a first component can be extracted from the user activity information received from one or more user devices. Similarly, components of the data vector associated with a location, music genre, and such can be assigned values from the user activity data.

The data vectors are used as input to a machine learning method that generates the association rule. Different types of algorithms can be used to generate the association rule using the data vectors as input. Exemplary algorithms includes, but are not limited to: Multi-Relation Association Rules, Context-Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

The user activity data used to form the vectors may be described herein as signals or user signals. The signals can include state information received from or collected by a personal assistant running on one or more user devices. In addition to a personal assistant, the signal information can be provided by an email system, operating system, browser, or any other component of a user's digital ecosystem. The signal data used to generate the association rules can be combined from multiple devices. The state information can describe a state of the computing device, such as time and location, as well as the state of individual applications such as a movie application, a music application, a dining or reservation application, a travel application, a shopping application, an email application, a calendar application, search data, web browsing, and such. In addition, credit card information, vendor information, or other account information can be received as a user signal to track user purchases. Aspects of the technology can provide the user an opportunity to opt in or out of the data sharing arrangements described herein.

Aspects of the technology described herein can perform signal enhancement. Some of the signals received from the personal assistant can be ambiguous or otherwise benefit from enhancement. For example, the signal data may include GPS information along with a time stamp and an indication that the user spent greater than a threshold period of time at the location. The signal can be enhanced by looking up an entity associated with the location, such as a restaurant or store. Additional information can then be retrieved for the entity. For example, the restaurant could be determined to serve Korean food. Korean food could then be entered as a value in a data vector component describing the event.

Other types of signal enhancements can be personal to the user. For example, a calendar entry on the user's device may indicate "dinner with Mom." A knowledge base associated with the user could be analyzed to identify the user's mom and generate a companion entry in the restaurant event. A knowledge base that includes personal information about the user may be described as a "semantic knowledge base" herein.

Having briefly described an overview of aspects of the technology described herein, an exemplary operating environment suitable for use in implementing the technology is described below.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can facilitate shopping events. For example, a mobile device may be used to look up product information while in a physical or virtual store. A virtual store, as used herein, is an online store accessible through an application and/or webpage. For example, a pizza vendor may provide a dedicated application to order pizza but may also have a webpage that facilitates orders. In addition to the virtual stores, the pizza vendor can have a restaurant where a user picks up pizza and/or is able to eat the pizza.

A combination of event records are generated from the user devices and can be analyzed to find usage patterns that can be used to determine a user's present shopping interest and related interest in coupons. The event records can comprise shopping events and non-shopping events. Shopping events include the purchase of a good or service at a virtual or physical location. Shopping events can also include investigation of goods or services where no purchase is made. For example, a user could visit a physical or virtual shoe store and not make a purchase. However, the visit can still comprise a shopping event that is used to generate a coupon event. In the virtual case, the particular shoes the user viewed can be part of the event details. Broadly, a visit to a shoe store could indicate a present shopping interest in shoes. Details of the shopping event and/or other events can be used to form a more specific interest in a particular style, brand, size, price range, and vendor preference for shoes. Historical shopping events can be combined with a recent shopping event to generate a coupon rule that is used to trigger a coupon presentation to the user. For example, if past shoe purchases are made at a particular store or a particular brand of shoes has been purchased in the past, then a coupon for the brand or store could be associated with a context. In this case, the context could be a geo-fence around stores that sell shoes. Upon entering the geo-fenced area, a coupon could be presented to the user for the shoe brand.

Server 106 can comprise server-side software designed to work in conjunction with client-side software on user devices 102a and 102b through 102n so as to implement any combination of the features and functionalities discussed in the present disclosure. For example, the server 106 may run a coupon engine, such as coupon engine 280, that determines a user's present shopping interest and associates a user with one or more coupon association rules. The server 106 may receive shopping records and other event data from the user devices. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 220 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 220 of FIG. 2. The data sources 104a through 104n can comprise a knowledge base that stores information about a venue, credit card history, travel history, social graphs, vendor, shopping histories, a user, or other entity related to a particular coupon.

Figure 2:
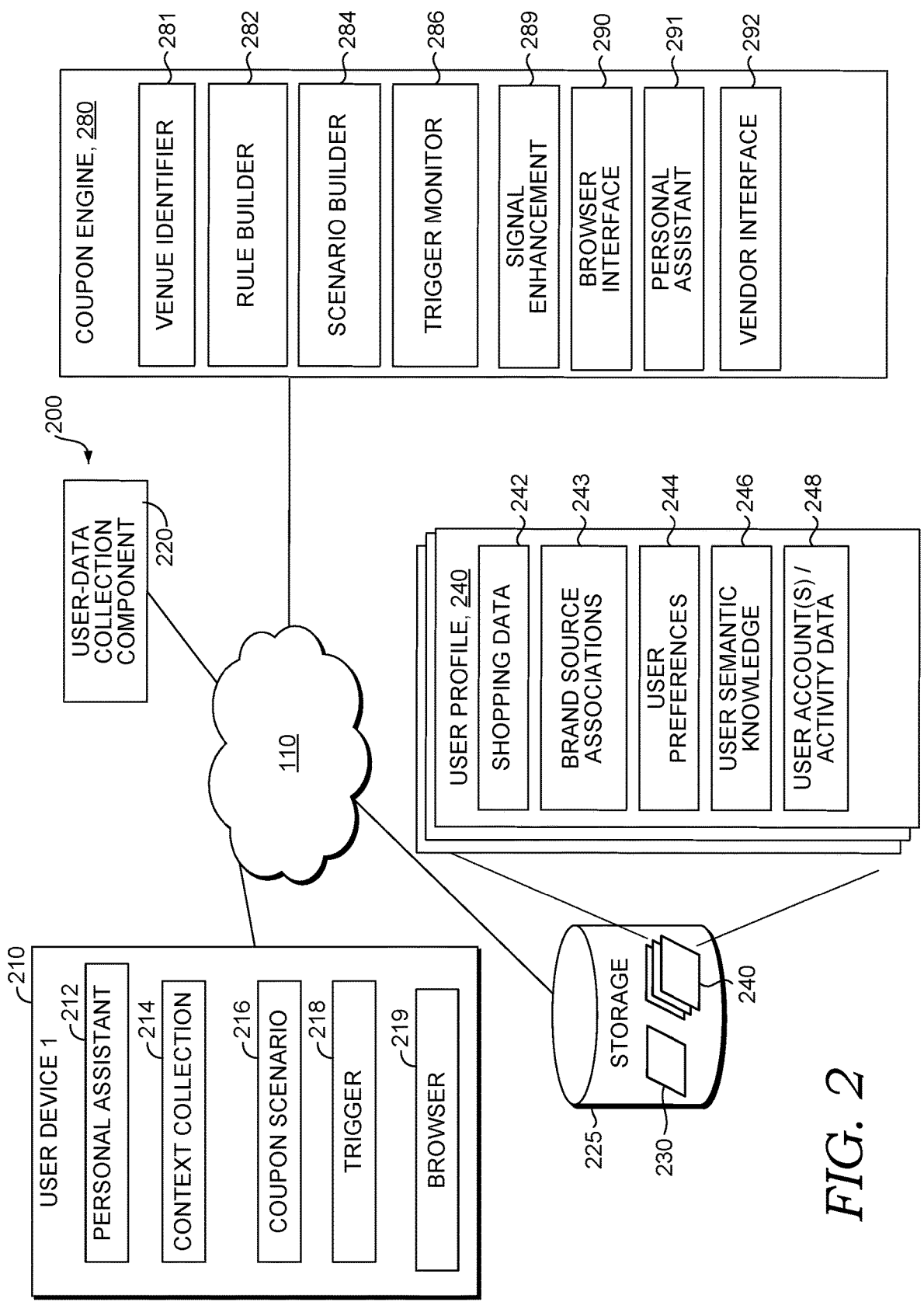
FIG. 2 is a diagram depicting an exemplary computing environment that can be used to generate a user-specific coupon recommendation, in accordance with an aspect of the technology described herein.

Operating environment 100 can be utilized to implement one or more of the components of system 200, described in FIG. 2, including components for collecting user data, monitoring events, generating coupon rules, determining user context, and/or presenting coupons to users at a contextually appropriate time.

Referring now to FIG. 2, with FIG. 1, a block diagram is provided showing aspects of an example computing system architecture suitable for implementing an aspect of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 220, coupon engine 280, originator device 210, and storage 225. Coupon engine 280 (including its components 281, 282, 284, 286, 289, 290, 291, and 292), user-data collection component 220, storage 225, and originator device 210 may be embodied as a set of compiled computer instructions or functions, program modules, computer software services, or an arrangement of processes carried out on one or more computer systems, such as computing device 700 described in connection to FIG. 7, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 220 is generally responsible for accessing or receiving (and in some cases also identifying) user data from one or more data sources, such as data sources 104a and 104b through 104n of FIG. 1. In some aspects, user-data collection component 220 may be employed to facilitate the accumulation of user data for one or more users (including crowdsourced data) for coupon engine 280. The data may be received (or accessed), and optionally accumulated, reformatted, and/or combined, by user-data collection component 220 and stored in one or more data stores such as storage 225, where it may be available to coupon engine 280. For example, the user data may be stored in or associated with a user profile 240, as described herein. In some aspects, any personally identifying data (i.e., user data that specifically identifies particular users) is either not uploaded from the one or more data sources with user data, is not permanently stored, and/or is not made available to coupon engine 280.

User data may be received from a variety of sources where the data may be available in a variety of formats. For example, in some aspects, user data received via user-data collection component 220 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user activity information (for example: app usage; online activity; searches; voice data such as automatic speech recognition; activity logs; communications data including calls, texts, instant messages, and emails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, online shopping activity (including data from online accounts such as Microsoft®, Amazon.com®, Google®, eBay®, PayPal®, video-streaming services, gaming services, or Xbox Live®), offline shopping activity, credit card data, user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein. In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 220 receives or accesses data continuously, periodically, or as needed.

The user device 210 can be similar to user devices 102a, 102b, and 102n. In an aspect of the technology described herein, the user device 210 includes a personal assistant application 212 and browser application 219. The personal assistant application 212 and the browser application 219 can provide coupons to the user. In one aspect, both the personal assistant application 212 and the browser application 219 can execute the same coupon scenarios. In another aspect, the browser 219 and the personal assistant application 212 can receive separate browser scenarios adapted for the tasks most likely performed by these applications. The coupon engine 280 can generate coupon scenarios, including trigger criteria, specifically tailored for the particular application executing the coupon scenario.

A personal assistant 212 may be able to recognize the user's speech and provide audible or visible coupons. In one aspect, the personal assistant 212 can interface with a user's calendar, email, task, web browsing, and other applications running on the user device 210. The personal assistant 212 can also access state information or sensor information from the user device 210. For example, the personal assistant 212 may be able to access GPS or other location information derived from Wi-Fi hotspots, cell towers, or other location methods.

In one aspect, the user explicitly provides permission for the personal assistant 212 to access this information and communicate the information to coupon engine 280. The user may be provided an opt-in or opt-out interface by the personal assistant 212 and otherwise notify the user about what information is being collected and transmitted to the coupon engine 280. The user may be allowed to specify what types of information may or may not be collected and transmitted.

The user device 210 also includes a context collector 214, a coupon scenario component 216, and a trigger component 218. It should be noted that the scenario and trigger components are optional in some aspects of the technology described herein. Instead of being located on the user device 210, these components could be located where the functions of the component are performed remotely, such as with coupon engine 280. It should also be noted that the components could be standalone, integrated with the personal assistant 212, or integrated with the browser 219. In a standalone aspect, the coupon scenario 216 and trigger 218 components can serve both the browser 219 and the personal assistant 212.

The personal assistant application 212 can help the user perform tasks through the one or more computing devices, such as the user device 210 and other devices associated with the user (not shown). A user is associated with the computing device when she uses the computing device or when the computing device knows and can collect context about the user. The user does not need to own the computing device; for example, a user's work computer could be owned by the employer but, nevertheless, be considered "associated with the user." Similarly, a user could share a family computer with multiple people, and the family computer can be considered "associated with the user." In fact, the family computer can be associated with multiple users. The context collection component on the family computer can understand which user is using the computer at a given time and associate context information with the appropriate user. In one aspect, a user is able to designate the devices that he or she is associated with. In one aspect, a user is associated with each device on which an instance of the personal assistant application 212 is installed and on which the user has registered his or her account information or user identification with the personal assistant application, or the personal assistant is able to understand the user through other context (such as user's voice, face detection, etc.).

The personal assistant application 212 can help the user complete both computing tasks, such as online shopping, and real world tasks, such as scheduling a pickup time for a user's dry cleaning on the way home from work. Coupons can help the user complete either type of task. Real world tasks, as used herein, occur, in part, outside of computers. For example, the exchange of physical good or services is an example of a real world task. Electronic tasks occur exclusively between computing devices and users of those computing devices. Displaying through a computer display or printing the result of a computerized communication have a real world element but are, nevertheless, considered electronic tasks for this application.

The personal assistant application 212 can monitor other applications and operating system functions. For example, the personal assistant application 212 may be able to monitor or have access to sensor data from one or more sensors on the user device 210. For example, the personal assistant application 212 may have access to accelerometer data, gyro data, GPS location data, Wi-Fi location data, image data from a camera, sound data generated by a microphone, touch data from a touchscreen, and other information.

The personal assistant application 212 can monitor user activities within one or more other applications and store a record of this activity forming contextual information. The context collector 214 stores details of events performed through the smartphone or other devices running an instance of the personal assistant application. For example, the user could read an email on their user device 210 causing a record of an "email read" event to be created. The "email read" record can describe a time and date when the email was read along with details describing the email, such as the recipients, subject line, description of attachments, etc. Similar information could be used to describe a text event. A call event could record the time and date of a call, call duration, and contact information (e.g., name, phone number) for the other person on the call. The contact information could be determined from caller ID information or taken from a local contact data store when the phone number matches an existing contact's phone number. All of this event data may be described as signal data.

A drive event could describe an instance of the user traveling in a car. As with a walking event, start and stop time of the drive event could be recorded along with geographic information such as a route. Additional information could include businesses visited before, after, or during the drive event. Geographic location information could be used to identify a business. Additionally, financial information could be gathered to confirm that a purchase was made during the drive event. A particular car may be identified by analyzing available Bluetooth connections, including when the smartphone connects to the car through a wireless or wired connection.

The context collector 214 may record an entertainment event, which is a specific type of shopping event. The location information for the user device 210 may be compared with a database of known events. For example, the phone's location at a football stadium coinciding with a known ballgame event can cause an entertainment record to be created. As with other events, payment information, calendar information, email information, and other data may be combined to determine that an entertainment event record should be created and to provide details. The calendar information can include a calendar description of the event. The email information can include a discussion of the event with friends, a payment receipt, or other information related to the event. These are just a few of the types of events that could be collected.

The context collector 214 collects signal data from the user device 210 and transmits the signal data over network 110 to the user-data collection component 220 or the coupon engine 280. The context collector 214 can provide initial filtering of signal data to cause only the most relevant signal data or signal data meeting certain criteria to be sent to the user-data collection component 220. For example, the signal data deemed relevant to shopping events may be communicated, while other signal data is excluded. In another aspect, the context collector 214 transmits all signal data without filtering. The context collector 214 may aggregate signal data for a period of time and then transmit it to the user-date collection component 220. For example, the context collector 214 may only transmit signal data when connected to a Wi-Fi connection.

The coupon scenario component 216 can store various coupon scenarios. The scenario can involve a coupon for food, music, clothing, and such. The coupon scenario component 216 may receive scenarios or coupons from the coupon engine 280. The scenarios or coupons can be associated with an association rule. The association rule comprises a context criteria and a corresponding coupon. The association rules may be grouped by type, and the coupon actually provided may be generated in real time by the coupon scenario component 216 by extracting information from the present context. For example, the association rule may indicate that the present context provides a high probability that the user is interested in seeing a movie in a movie theater. The type of coupon may show movie times at a nearby theater along with a discount for one or more movies. The coupon scenario component 216 may identify one or more nearby theaters based on the present location of the user, which is part of the user's present context. The coupon may then be generated using show times from the nearby theater, coupons or discounts for the nearby theater, and directions to the nearby theater. Other information could be included in this coupon.

Other coupons are fixed in advance and merely presented by the coupon scenario component 216 when a present context of the user device matches a context associated with a scenario. For example, the coupon can be for 10% off coffee when the context is satisfied. In this case, the coupon does not need to be generated in real time but can merely be activated or an offer for the coupon provided. In one aspect, the coupon is a card-linked coupon. A card-linked coupon is associated with a user credit card and used by purchasing a good or service associated with the coupon using the credit card.

The trigger component 218 can be incorporated into the coupon scenario component 216 or can be separate. The trigger component 218 monitors the present context of the user device 210 to determine when the present context matches a context associated with an association rule and/or scenario. Upon determining that the present context matches the context associated with the scenario, the coupon scenario component 216 can be notified. Additionally, the trigger component 218 may communicate with the coupon engine 280 to determine the present context. The coupon engine 280 could generate a scenario in real time and communicate it to the user device 210. In this way, the trigger component 218 can work independently of a coupon scenario component 216, which may not even be present on the user device 210 in some implementations.

In another implementation, the trigger component 218 communicates present context information to the contextual trigger monitor 286 in real time. The trigger monitor 286 then determines when the context of the user device 210 matches a context associated with an association rule and/or scenarios. In this implementation, the context collector 214 communicates signal information for the purpose of generating user-specific association rules. The trigger component 218 communicates contextual information that can be used to trigger an association rule that has already been built previously.

The browser 219 can also collect contextual data and transmit to the user-data collection component 220. The browser 219 is able to monitor the present online context of the user as well as the physical context of the user. For example, a user may open a web browser while in a department store. The browser 219 can monitor location data directly or as derived by context collection component 214 or some other component on the user device 210 and take specific online actions tied to a coupon scenario. For example, the browser may open to a website associated with the store. In a coupon interface integrated with the browser, rather than the webpage, a coupon for a brand of clothing sold by the department store may be presented to the user. The coupon can include links to aspects of the department store's website that are related to the products discounted in the coupon. For example, a coupon for a particular brand of shoes could be linked to a listing of shoes associated with a particular brand sold by the department store. In one aspect, the browser can provide specific filter data to the website to generate a desired landing page. For example, the link could be to a URL associated with the department store's shoes along with a filter criteria for the brand.

Figure 3:
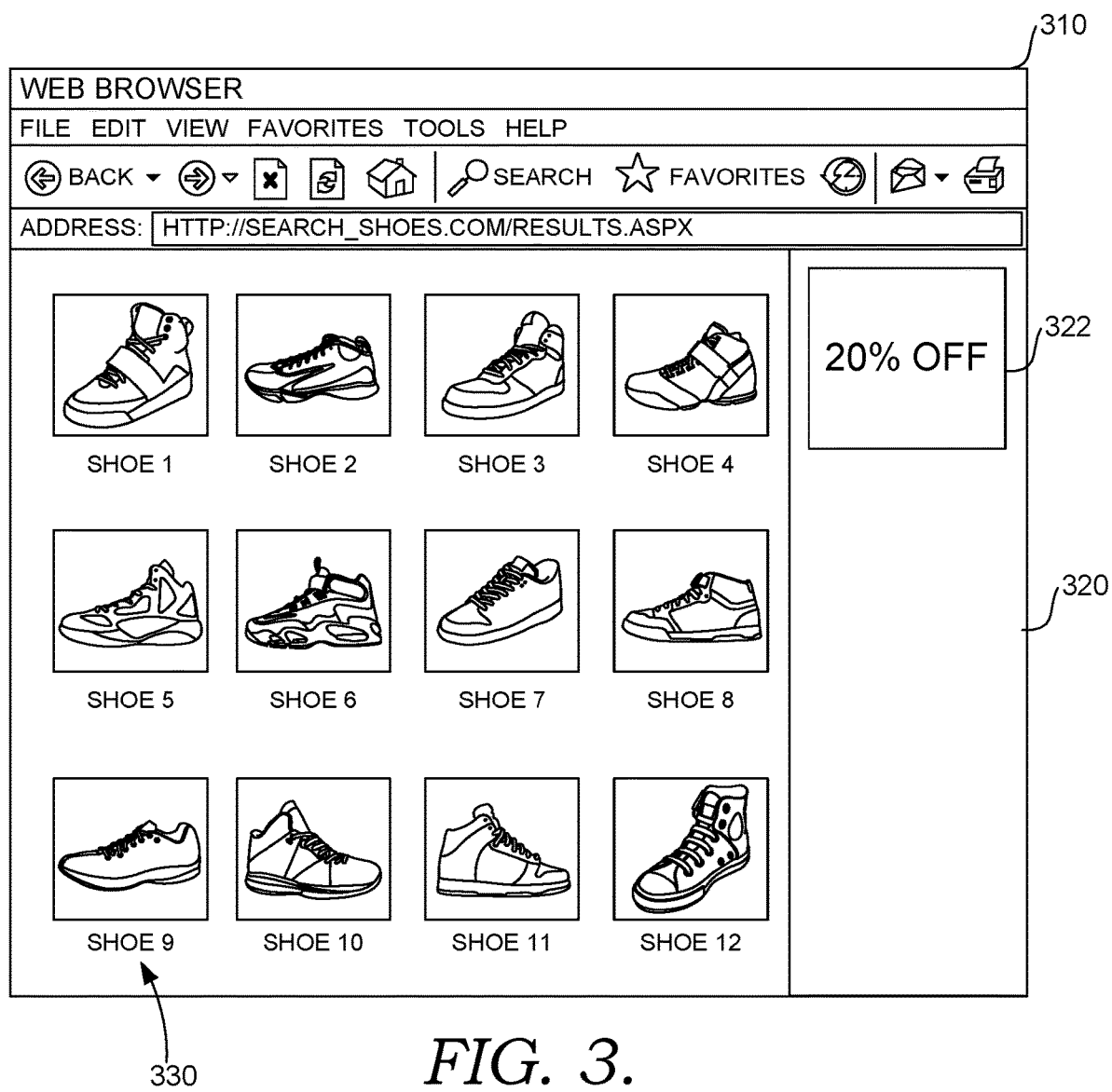
FIG. 3 is a diagram depicting an exemplary browser interface with an integrated coupon recommendation interface, in accordance with an aspect of the technology described herein.

Turning briefly to FIG. 3, a browser 310 with a coupon interface 320 is provided. The content of the coupon interface 320 originates with the browser in one aspect. In another aspect, the coupon interface 320 is filled with content provided by a personal digital assistant. The content of the coupon interface 320 can be completely independent of the webpage content 330. The webpage content 330 is provided by a webpage server. The coupon content can be selected by a trigger component 218 associated with the browser. The trigger component associated with the browser 310 monitors for a context that satisfies the triggering criteria associated with one or more coupon scenarios. Upon detecting a match, a coupon associated with a scenario or rule is displayed. When the present context does not match any available coupon scenarios, then the coupon interface 320 can be removed. Aspects of the technology described herein are not limited to a location for the coupon interface 320. The coupon scenarios evaluated by the browser 310 can be stored locally on the user device 210 running the browser 310.

In this way, the browser can enable a coupon scenario based on the user's physical context data as well as the user's online data. Returning to the shoe example from above, the coupon engine 280 could have previously identified a present shopping interest in shoes. The user's previous shoe related shopping data could be mined to identify a shoe purchase pattern related to a brand, price, style, timing, or other scenario. As an example of a timing scenario, the user shopping history could reveal that the user purchases new running shoes every six months. Upon a user entering a store selling running shoes within a threshold amount of time from the last running shoe purchase, the coupon scenario associated with the purchase of running shoes could be triggered. Had the user entered the same store outside of the threshold amount of time, then a different coupon scenario or no coupon scenario might be triggered.

At a high level, aspects of coupon engine 280 may determine, from the user data, whether or not a user is presently interested in receiving a particular coupon. In general, the coupon should only be presented when the user has a present shopping interest in an item or service associated with the coupon. The coupon engine 280 can generate a coupon association rule that comprises a triggering criteria and an associated coupon. The triggering criteria can match a context.

The coupon engine 280 includes several subcomponents. The subcomponents include venue identifier 281, rule builder component 282, scenario builder component 284, trigger monitor 286, signal enhancement component 289, browser interface component 290, personal assistant component 291, and vendor interface component 292. The coupon engine 280 and the functions associated therewith may be distributed across the system 200. For example, the components could be distributed between servers and a client device, such as a smartphone. In some aspects, coupon engine 280 and/or one or more of its subcomponents may determine interpretive data from received user data. Interpretive data corresponds to data utilized by the subcomponents of coupon engine 280 to interpret user data. For example, interpretive data can be used to provide context to user data, which can support determinations or inferences made by the subcomponents. Moreover, it is contemplated that aspects of coupon engine 280 and its subcomponents may use user data and/or user data in combination with interpretive data for carrying out the objectives of the subcomponents described herein.

The venue identifier 281 can determine that a mobile device is currently located within a particular venue. In particular, active coupon scenarios can be used to disambiguate a user's location and associate the user with one of several nearby venues. The venues in question can be related to shopping. Once disambiguation is complete, or no disambiguation is required, data associated with the venue can then be analyzed to determine the user's current shopping context.

As an input, the venue identifier 281 receives location data from a mobile computing device and determines that the mobile computing device is currently located in a venue, such as a restaurant, church, department store, movie theater, hospital, etc. The venue identifier 281 can identify a venue by matching the location data to a data record that associates venues with locations.

In some instances, venue disambiguation may be performed by the venue identifier to determine in which of several nearby venues the user is actually in. For example, the GPS information may be accurate enough to determine that a mobile device is located within a mall but not able to pinpoint the location to a specific store in a mall. The venue disambiguation performed by the venue identifier 281 may select a particular store that the user is likely to have an interest in based on semantic data known about the user, including a an active coupon scenario. An active coupon scenario, as used herein, refers to a coupon scenario where triggering criteria are actively being monitored for satisfaction by a present context. For example, a user associated with an active shoe coupon scenario could be determined to be within a shoe store instead of an adjacent hair salon.

The venue identifier 281 can associate a venue with shopping records that are generated by the user or other users. A shopping record can include items purchased, time, price, brand, item descriptions, vendor, venue, etc. Other information such as other people, especially social contacts, present during the purchase can be included.

Venue identifier 281, in general, is responsible for determining venues associated with a geographic location. In some aspects, venue identifier 281 identifies a set of venues by monitoring user data for venue-related information, such as GPS data. Venues may be inferred using an inference engine and analyzed for relevance to a user based on, for example, the association of user data with the venue-related data. By way of example, venues may be inferred by analyzing user data (including interpretive data) for venue-related information, such as user location activity indicating patterns of visiting geographic locations corresponding to venue locations or online activity such as websites or social media pages visited by a user, communications associated with venues (such as emails received from a business or school), purchase history, or combinations of these. In some cases, venues may be identified using a knowledge base (such as a semantic knowledge base) of venues or entities associated with data features observed in user data, such as venues associated with geographic locations, domains of websites or emails, phone numbers, etc. In some aspects, similar methods may be utilized by search engines to identify entities that may be relevant to a user based on user search queries and/or user search history.

As a further example, interaction with a venue may comprise data indicating a user visiting a store even when no purchase is made. One tracked variable may correspond to an arrival location, such as an arrival location name. In detecting the venue, venue identifier 281 may infer the arrival as being satisfied based on user data comprising GPS data on the user's phone (e.g., user device 102a of FIG. 1), wherein the arrival location name is identified as a store and stored based on interpretive data that includes map data used to associate coordinates from the user's phone with a corresponding location name Thus, for one instance, the arrival location name may be "Walmart," and for another instance, the arrival location name may be "Target," as examples. However, it will be appreciated that the level of granularity in the detection and tracking of potential user interactions with venues can vary. Other examples of potential tracked variables, or more generally venue variables, include arrival time (e.g., a time stamp), arrival location coordinates, visit duration, routes or sequences of locations, and many more.

Venue identifier 281 may search and/or analyze user data for any of a variety of venue-related data including venue variables. By matching user data to one or more venues and/or venue variables thereof, venue identifier 281 may detect venues and identify relevant venues from patterns of detected venue interaction for users; for example, venue interactions indicating a pattern, such as the user visiting a grocery store every Wednesday night. Although several examples of how venue identifier 281 may make such determinations are described herein, many variations of venue identification and venue-variable monitoring are possible in various aspects of the technology described herein.

The rule builder component 282 generates shopping rules or trends for a user or users. The shopping rules can identify a user's present shopping interest based on past shopping activities. A shopping rule is a formal statement of a shopping trend. For example, if the shopping trend for a user is buying groceries every Wednesday, then the rule can be stated as: W:G, where W=today is Wednesday and G=buying groceries. W and G can be associated with a confidence factor that describes a strength or correlation between W and G. The shopping rules can then be used to build coupon scenarios. In this example, a coupon scenario could have a triggering criteria of day=Wednesday and an associated coupon for a grocery item or grocery store.

Example approaches are described below, where each instance of a shopping record has corresponding historical values of tracked variables that form patterns, and component 282 may evaluate the distribution of the tracked variables for patterns. In the following example, a tracked variable for a shopping event is a time stamp corresponding to an instance of the shopping event, such as a show purpose. Other variables, such as vendor, brand, and venue, can be tracked. But only time is used in the present example. However, it will be appreciated that, conceptually, the following can be applied to different types of historical values.

A bag of time stamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the s records, such as:

$$h_{ij} = \sum_{m=1}^{M} I[dayOfWeek[t_m]=i] \wedge I[hourOfDay[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{iC} = \Sigma_{j \in C} h_{ij}$. Any of various semantic time resolutions may be employed, such as weekdays and weekends, or morning, afternoon, and night. An example of the latter is where C∈{morning, afternoon, night}, morning={9, 10, 11}, afternoon={12, 13, 14, 15, 16}, and night={21, 22, 23, 24}.

An additional data structure utilized in representing a communication event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the second three-week period of available time stamps. $N^{(j)}$ may be utilized to denote the number of j-week time stamps available in the tracked data; for example, $N^{(3)}$ denotes the number of three-week periods available in the time stamps.

Coupon engine 280 in conjunction with its subcomponents may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For time stamps, examples include Tuesday at 9 am, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_{i}^{K}(\alpha_0 + h_i)};$$

where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_i$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.04.$$

Also, in some implementations, a confidence score can be generated for a corresponding tracked variable that is indexed by a period and a number of time stamps. Examples include 1 visit to a venue per week, and 3 visit to a venue every 2 weeks. Using a Gaussian posterior, a confidence score may be generated for a pattern for every period resolution, denoted as j. This may be accomplished by employing the formula:

$$\hat{\mu}^{(j)} = \lambda \left( \frac{1}{N^{(j)}} \sum_{i}^{N^{(j)}} w_i^{(j)} \right) + (1+\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$, and $\mu_0$ are parameters to the formula. A confidence score can be computed by taking a fixed interval around the number of time stamps prediction and computing the cumulative density as:

$$conf_j = P\left(\left|x - \hat{\mu}^{(j)}\right| < a\right) = \int_{\hat{\mu}^{(j)}-a}^{\hat{\mu}^{(j)}+a} \mathcal{N}\left(x | \hat{\mu}^{(j)}, \hat{\sigma}^{(j)}\right), \text{ where}$$

$$\hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), rule builder component 282 may identify that a series of shopping records correspond to a shopping rule for the user. As a further example, rule builder component 282 may determine that a shopping pattern is being practiced by a user where one or more of the confidence scores for one or more tracked variables satisfy a threshold value. In this regard, an interaction of a pattern of purchases may be determined as being practiced based on rule builder component 284 identifying one or more patterns in historical values of one or more tracked variables of the shopping records.

In some aspects, shopping patterns may be determined by monitoring one or more variables related to shopping. These monitored variables may be determined from the user data described previously as tracked variables or as described in connection to user-data collection component 214. In particular, the variables may be determined from contextual data related to shopping data from other users, such as other users present at the same venues previously. Thus, the variables can represent context similarities among multiple shopping records. In this way, patterns may be identified by detecting variables in common over multiple records. More specifically, variables associated with a first record may be correlated with variables of a second record to determine a likely pattern. For example, where a first record comprises a user eating pizza on Wednesday evening and a second interaction comprises a user eating pizza the next Wednesday evening, a pattern may be determined that the user eats pizza on Wednesday evening. A pizza coupon could then be provided to the user on Wednesday.

In this example, the in-common variables for the two shopping events include the same food (pizza), the same day of the week (Wednesday), and the same time (evening). This trend could form a shopping rule including these three variables and associated values.

In some aspects, confidence scores of availability may be determined by utilizing one or more confidence metrics. In some implementations, confidence metrics increase confidence scores based on detected repetitions or iterations of similar shopping events over time as indicated in patterns formed by the shopping events. Confidence scores may be discounted based on lapsed time with respect to one or more of the repetitions or iterations. For example, a confidence score that may have been high in the past may be low in the present based on corresponding user behavior or behaviors having occurred far in the past. As another example, iterations may be phased out from consideration and/or storage over time. In this way, the coupon engine 280 can adapt to changing lifestyles in which users may alter their interests and behaviors over time, and thus no longer conform to a previous shopping pattern. As confidence decreases below a threshold, then the associated coupon scenario can be deactivated. The confidence associated with each rule can be evaluated periodically and updated. The updated rules, including deactivation instruction, can be communicated to a personal assistant by personal assistant component 291 and to a browser by browser interface component 290.

Continuing with FIG. 2, some aspects of coupon engine 280 use statistics and machine learning techniques. In particular, such techniques may be used to determine pattern information associated with a user, such as shopping patterns, user knowledge such as semantic understanding of the user, relevance of venues, vendors, and brands, and information to the user, and urgency. For example, using crowdsourced data, aspects of the technology described herein can learn to associate keywords or other context and information item features with higher levels of relevance or urgency, based on determining how other users respond or react to information items with those features. In one aspect, pattern recognition, fuzzy logic, neural network, finite state machine, support vector machine, clustering, or similar statistics and machine learning techniques are applied.

In one aspect, the rule builder 282 can use a vector analysis to build a rule. The rule builder 282 receives signals and enriched signals as input and builds a data vector describing an event. Initially, the rule builder 282 can use a classification process to identify signals that describe a specific event. Different types of data vectors may be built for different types of events. The data vectors for different types of events may have a different schema. The schema defines components of the data vector and the format that values associated with the components can take. For example, a movie purchase vector could include a time component, a location component, a source component, a genre component, a companion component, and other components. The companion component can include identification information for one or more people that participated in the movie viewing experience with the user. The participants can be identified from social posts, emails, text messages, and location information collected from multiple users. In one aspect, location information from multiple users within a user's social network are mined to determine when the users are located at the same place at the same time. This information can be generated by the signal enhancement component 289 and added as a component of a vector.

A shopping data vector can include a time component, a location component, an entity component, a companion component, a brand component, a price component, and other components that describe a shopping event. The price component can include information received from a credit card or other financial institution detailing expenditures made during the shopping event. Various merchants or vendors may also provide detailed information about the shopping event that can be included within a shopping vector.

A restaurant vector can include a time component, a location component, a date component, a restaurant entity component, a restaurant food type component, a restaurant price component, a restaurant review component, a companion component, and others. The restaurant food type, price, and review components can be derived from a knowledge base. The review component describes a rating given to the restaurant.

In one aspect, the data vectors may include a component indicating whether the associated event was routine or non-routine. Events may be classified as routine or non-routine by a routine classifier that analyzes user events to determine whether a particular event is routine or non-routine. In one aspect, a user's location outside of a home geographic area can indicate that the event is non-routine. In one aspect, events that are dissimilar to other events in the user's history are initially classified as non-routine. As more data is gathered over time, the classification of an event can change from routine to non-routine. The routine classifier can classify various events as routine or non-routine. In addition, the routine classifier can determine whether the present context is a routine context or a non-routine context. When the present context is a non-routine context, non-routine association rules can be accessed to make suggestions. When the current context is routine, then routine association rules can be accessed to generate suggestions.

The rule builder 282 can generate association rules using a machine learning algorithm using multidimensional data vectors as input. Each dimension can be a different contextual component, such as time, day, location, activity, etc. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

The rule builder 282 can take the data vectors as input and generate an association rule as output. The association rules may be associated with a particular type of event. For example, online shopping association rules could be generated, a series of movie association rules could be generated, a series of restaurant association rules could be generated, a series of travel association rules could be generated, and so forth.

The association rule can be a multivariable association rule where the context is defined with multiple parameters, such as time, location, day, companions, recent activities, etc. In this way, the association rule represents a user behavior pattern where past context and past behaviors are mapped to a current context and a suggestion related to the past behavior.

The scenario builder 284 uses association rules to build a coupon scenario. The coupon scenario comprises a context defined by trigger criteria and an associated coupon to be presented when the trigger criteria are satisfied. The trigger criteria can specify specific signal variables to be monitored, such as GPS, time of day, day of the week, present companions, and such. The scenario builder 284 may select from association rules having the highest confidence score, for example, the 10 association rules having the highest confidence score. In another aspect, only association rules having above a threshold confidence score are considered.

As mentioned, the association rule describes a context and a shopping purchase. The scenario builder 284 can map the shopping purchase to a relevant coupon. For example, the shopping purchase for a specific good or service can be mapped to a coupon for the good or service. The coupons can be used to promote loyalty by incentivizing shopping purchases of goods or services from a vendor or of a brand the user currently patronizes. The coupons can also be used to incentivize the user to try new vendors or brands.

The scenario builder 284 can then store scenarios. The coupon scenarios can then be distributed to one or more user devices were various applications on the user devices monitor for satisfaction of the triggering criteria associated with each coupon scenario. In one aspect, the trigger monitor 286 can monitor user activities and context to determine when the trigger criteria is satisfied. The trigger monitor 286 can then communicate with the user device to indicate that a particular coupon should be presented. The trigger monitor 286 can generate and then communicate a specific coupon.

The trigger monitor 286 can trigger the presentation of a coupon when the corresponding context portion of a coupon scenario is satisfied. The trigger monitor 286 can receive real-time contextual or triggering information from a user device or devices and determine when the present context of the user device matches the context in a coupon scenario. The coupon associated with that particular scenario can then be output to the user. The context in the scenario can be multivariable.

The trigger monitor 286 can also work collaboratively with trigger monitors on one or more user devices to provide each device with relevant contextual information. The trigger monitors on individual user devices can then monitor local signals in combination with signals generated by one or more other user devices to determine whether the present context satisfies a trigger criteria.

The signal enhancement component 289 can add to or clarify information within the signals. In one aspect, the signal enhancement component 289 can provide additional information about entities described in the signal data. In another aspect, the signal enhancement component 289 identifies entities associated with location data in the signal data. For example, the signal data could include information indicating that the user spent above a threshold amount of time at a particular location. An entity, such as a restaurant or other business, associated with the location could be determined by the signal enhancement component 289. The signal enhancement component 289 can include an entity look-up table that associates various entities with locations. The signal enhancement component 289 can also identify or determine detailed information about different entities. For example, in addition to determining the name and location of a business, details about the services provided by the business can be determined. For example, the type of food served by a restaurant could be determined.

The signal enhancement component 289 can also include a knowledge base that includes personal information about the user. For example, the user's social contacts derived from an analysis of the user's social network, email, phone calls, and other information may be built. For example, signal enhancement component 289 may be able to determine which of several Mikes in the user's social network is associated with a current signal. For example, the signal enhancement component 289 may be able to determine that the user ate dinner with a first of three Mikes in the user's social network by determining that the first Mike was in a social post with the user at the time the user was at the restaurant. The first Mike could then be included in a companion component of a data vector describing the dining event.

The browser interface 290 can communicate coupon scenarios to one or more browsers associated with a user's device. The browser can then monitor context to determine if a trigger associated with a coupon scenario is satisfied with the present context of the end user device. The browser interface 290 can also receive contextual information from a browser and provide this information to one or more other components.

The personal assistant interface 291 can communicate with on one or more user devices. The personal assistant interface 291 can provide coupon scenarios to a personal assistant and receive contextual information from a personal assistant that can then be synchronized across other applications monitoring a user context for satisfaction of a trigger criteria.

The vendor interface 292 allows vendors to submit coupons. In one aspect, the vendor interface 292 also includes a web crawling functionality that is able to retrieve publicly available coupons published on the Internet or through other sources. These electronic coupons can be collected and distributed to users. The coupons can include a description of a product or service for which a discount is provided. The coupons can also include various recipient requirements. For example, a recipient may only be eligible to receive X number of coupons in a given time period from a particular vendor. In another aspect, loyalty coupons may only be provided to users who previously purchased a good or service associated with the coupon. In another aspect, coupons may specify that only potential new customers may receive the coupon. The coupons may have an expiration date or distribution limits. For example, the coupon may include a distribution limit specifying that the coupon be distributed to no more than 10,000 users.

Example system 200 also includes storage 225. Storage 225 generally stores information including data, computer instructions (e.g., software program instructions, routines, or services), logic, profiles, and/or models used in aspects of the technology described herein. In an aspect, storage 225 comprises a data store (or computer data memory). Further, although depicted as a single data store component, storage 225 may be embodied as one or more data stores or may be in the cloud.

In one aspect, storage 225 stores one or more user profiles 240, an example aspect of which is illustratively provided in FIG. 2. Example user profile 240 may include information associated with a particular user or, in some instances, a category of users, such as users with the same shopping interest(s). As shown, user profile 240 includes shopping data 242 (which may include venue pattern data), brand source associations 243, user preferences 244, user semantic knowledge 246 (or a user knowledge base), and user account(s) and activity data 248. The information stored in user profiles 240 may be available to the routines or other components of example system 200.

As described previously, shopping data 242 generally includes information about venues relevant to the user and associated user interactions with venues, such as shopping patterns. Brand source associations component 243 generally includes the set of one or more sources of information corresponding to brands of interest to the user. User preferences 244 generally include user settings regarding the importance (or relevance) of specific goods or services for designated people, specific information sources, thresholds, and/or notification preferences, as described herein. For example, user preferences 244 may store user feedback and settings indicating the level of acceptance for coupons or when and how coupons can be presented. In some aspects, users can assign constraints or priorities to specific types of coupons.

User semantic knowledge 246 generally comprises a set of information inferred or otherwise determined about the user, and may be embodied as a knowledge base. User information determined from user data (including feedback and other user input) may be stored in user semantic knowledge 246.

User account(s) and activity data 248 generally includes user data collected from user-data collection component 220 (which in some cases may include crowdsourced data that is relevant to the particular user), and may be used for determining semantic knowledge about the user. (In some aspects, user account(s) and activity data 248 includes user semantic knowledge 246.) In particular, user account(s) and activity data 248 can include user data regarding user emails, texts, instant messages, calls, and other communications; social network accounts and data, such as news feeds; online activity; and calendars, appointments, or other user data that may be used for determining relevance, urgency, scheduling, contextual information, and/or supplemental information. Aspects of user account(s) and activity data 248 and/or user semantic knowledge 246 may store information across one or more databases, knowledge graphs, or data structures.

Figure 4:
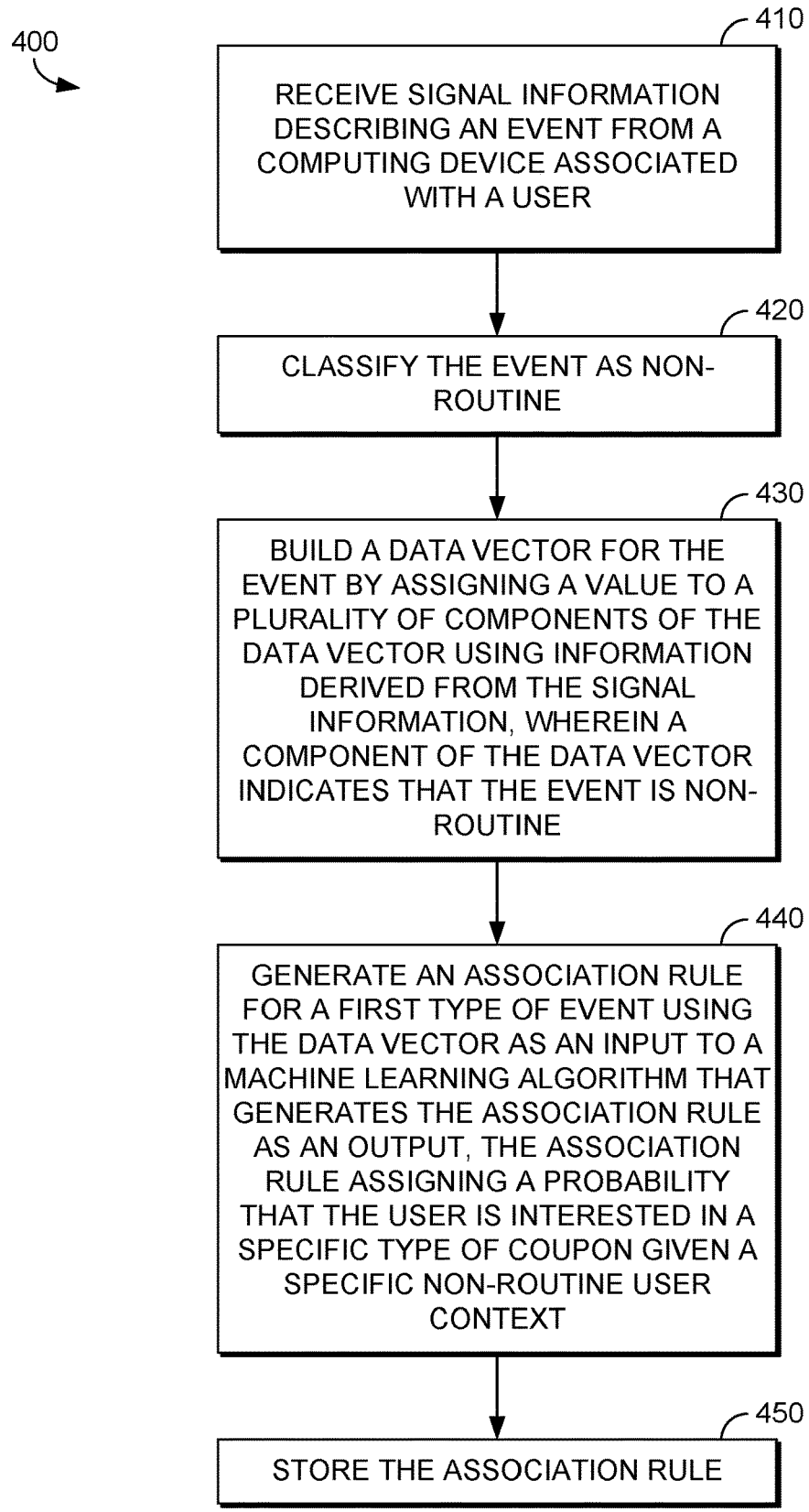
FIG. 4 is a diagram depicting a method of generating a coupon recommendation rule, in accordance with an aspect of the technology described herein.

Turning now to FIG. 4, a method 400 of generating user-specific contextual association rules for coupons is provided. Method 400 may be performed on a server located within a data center, for example, by coupon engine 280. At step 410, signal information describing an event is received from a computing device associated with a user. The signal information can include data describing the event as well as data describing other events or no events. Initially, data associated with a specific event can be identified using an event classification system. The event can describe a purchase, but does not need to. Evaluation of shopping events and non-shopping events can be combined to form a coupon association rule. For example, a first event may be a user attending a religious service and a second event may be a user purchasing coffee. An association rule may be generated from these events to provide a coupon for a coffee shop or restaurant that serves coffee after the user attends a religious service.

Signal enhancement processes can be run on the signal information to disambiguate it or to provide supplemental information. In one aspect, an entity within the signal information is identified and supplemental information about the entity is retrieved from a knowledge base. The supplemental information can then be used along with information found directly in the signal information to generate a data vector for an event. In other words, the supplemental information can be a value associated with a component of the data vector. For example, a user's home or work location can be noted. The raw signal data may indicate a geographic location for an event and the knowledge base can be used to associate the location data with "home."

The knowledge base can comprise information about the user. In one aspect, a user profile is populated with information gathered by a personal assistant and/or other components. The user profile can include information about where the user works, lives, and the people the user interacts with. This personal information can be used to disambiguate terms within the signal data.

At step 420, the event is classified as non-routine. As mentioned, a non-routine event can be treated differently from routine events. For example, a user may make a purchase, such as hiring a car company, while on a business trip. Because the user is on a business trip, the event may be atypical and should be given less weight when determining a shopping pattern. For example, the car company may not be available in the user's hometown or the user may not use car companies when in his hometown, instead using his own car. Giving normal weight to such an event could skew the association rules built.

Aspects of the technology may use non-routine events to build non-routine association rules with a context limited to characteristics that make the event non-routine. For example, events that occur while the user is on a business trip can be used to build coupon association rules that are only triggered while the user is on a subsequent business trip.

At step 430, a data vector for the event is built by assigning a value to a plurality of components of the data vector using information derived from the signal information. A component of the data vector indicates that the event is non-routine. As mentioned, a data vector comprises multiple components. Data vectors associated with different types of events can have different constituent components. For example, a shopping event may include the following vectors: vendor, time, brand, price, venue, item description, item classification, and such. In one aspect, each event identified within the signal data can be represented by an individual data vector. Eventually, a plurality of data vectors describing different events can be generated.

At step 440, an association rule for a first type of shopping event is generated using the data vector as an input to a machine learning algorithm that generates the association rule as an output. The data vector may be one of several data vectors used as an input to generate the association rule. In one aspect, data vectors associated with the same type of event are used to generate an association rule for the type of event. For example, a plurality of data vectors describing dining events can be used to generate a plurality of association rules for dining events. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

In one instance, only non-routine data vectors are used to generate an association rule classified as non-routine. Routine association rules can take routine data vectors as input. In another aspect, routine events are combined with non-routine events to generate association rules for a non-routine context. For example, brand preferences may remain consistent across routine and non-routine purchase. The brand preferences can be applied when selecting a coupon associated with a non-routine association rule. Additionally, multiple association rules may be generated simultaneously. The association rule assigns a probability that the user is interested in a contextual coupon given a specific non-routine user context. The association rule may be classified as associated with a non-routine event.

The association rule can be a multivariable association rule where the context is defined with multiple parameters, such as time, location, day, companions, recent activities, etc. In this way, the association rule represents a user behavior pattern where past context and past behaviors are mapped to a current context and a coupon related to the past purchases in the context.

At step 450, the association rule is stored. In one aspect, only association rules with above a threshold correlation between the context and the coupon are stored.

Once an association rule is generated and stored, it can be used to present a coupon to the user when a given context occurs. In one aspect, additional signal information is received from the user device associated with the user. As a single information is received, the context of the user may be determined. The context can be defined by the user's location, a user's browsing activity, time of day, and what the user is doing, among other factors. The present context of the user can be determined to match the context in one or more association rules. When the context matches multiple association rules and the probabilities associated with the coupon, the rules can be ranked, along with other factors, to determine which coupon is provided. When the context matches a single rule, then the coupon may be presented to the user. As mentioned, the coupon may be presented as a visual indication on a display associated with the computing device, audibly, or through some other method. The coupon may be communicated to a personal assistant application, a browser application, or other application. The personal assistant application or browser can monitor user data to determine when the present context matches the context where a coupon should be presented based on the association rule. In another aspect, context is monitored by a data center component that provides a trigger notification to an application through which the coupon is to be presented.

Figure 5:
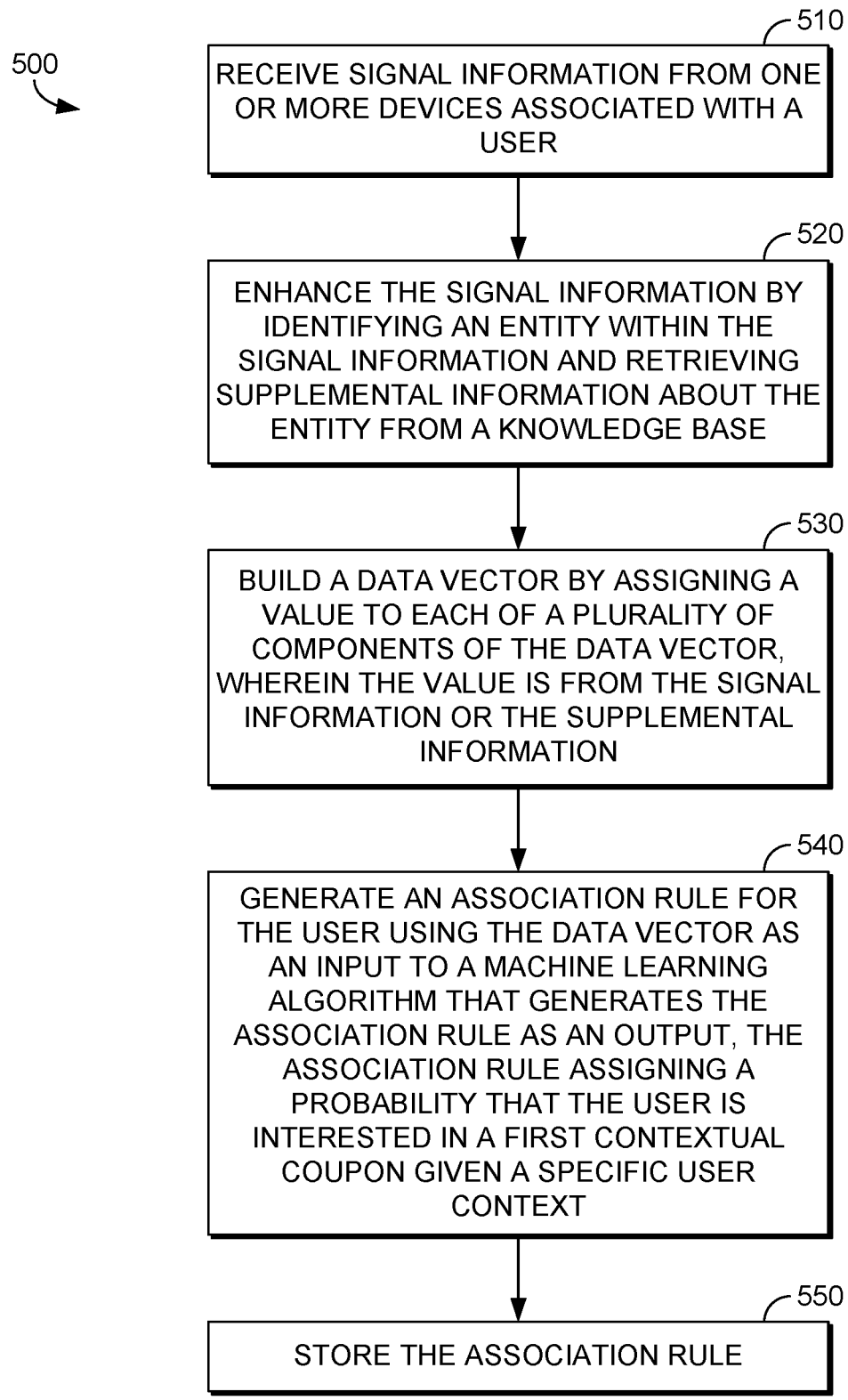
FIG. 5 is a diagram depicting a method of generating a coupon recommendation, in accordance with an aspect of the technology described herein.

Turning now to FIG. 5, a method 500 of generating user-specific contextual association rules for coupons is shown. Method 500 may be performed on a server located within a data center, for example, by coupon engine 280. At step 510, signal information from one or more devices associated with a user is received. The signal data may be received from multiple user devices including smartphones, smart watches, smart glasses, tablets, laptops, PCs, and other computing devices. In addition, signal data may be received from one or more online services such as video services, music services, shopping services, social networks, email services, and others. The signal information can include data describing the event as well as data describing other events or no events. Initially, data associated with a specific event can be identified using an event classification system. In one aspect, the signal data includes use or rejection of coupons received previously. The rejection may be implicit or explicit. An explicit rejection can be provided through a coupon interface that provides a feedback mechanism for the user to reject a coupon. An implicit rejection occurs when the user does not use a coupon provided to the user. The user's rejection of a coupon qualifies as an event as "events" are described herein.

At step 520, the signal information is enhanced by identifying an entity within the signal information and retrieving supplemental information about the entity from a knowledge base. For example, the entity could be a restaurant associated with a dining event, and the supplemental information could include food type, average price, average customer reviews, active specials during the dining event, and other information.

At step 530, a data vector is built by assigning a value to each of a plurality of components of the data vector. The value is from the signal information or the supplemental information. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

At step 540, an association rule for the user is generated using the data vector as an input to a machine learning algorithm that generates the association rule as an output. The association rule assigns a probability that the user is interested in a contextual coupon given a specific user context.

The association rule can be a multivariable association rule where the context is defined with multiple parameters, such as time, location, day, companions, recent activities, etc. In this way, the association rule represents a user behavior pattern where past context and past behaviors are mapped to a current context and a coupon related to the past behavior.

At step 550, the association rule is stored. In one aspect, only association rules with above a threshold correlation between the context and the coupon are stored.

Once an association rule is generated and stored, it can be used to present a coupon to the user when a given context occurs. In one aspect, additional signal information is received from the user device associated with the user. As a single information is received, the context of the user may be determined. The context can be defined by the user's location, time of day, and what the user is doing, among other factors. The present context of the user can be determined to match the context in one or more association rules.

When the context matches multiple association rules and the probabilities associated with the coupon, the rules can be ranked, along with other factors, to determine which coupon is provided. When the context matches a single rule, then the coupon may be presented to the user. As mentioned, the coupon may be presented as a visual indication on a display associated with the computing device, audibly, or through some other method.

Figure 6:
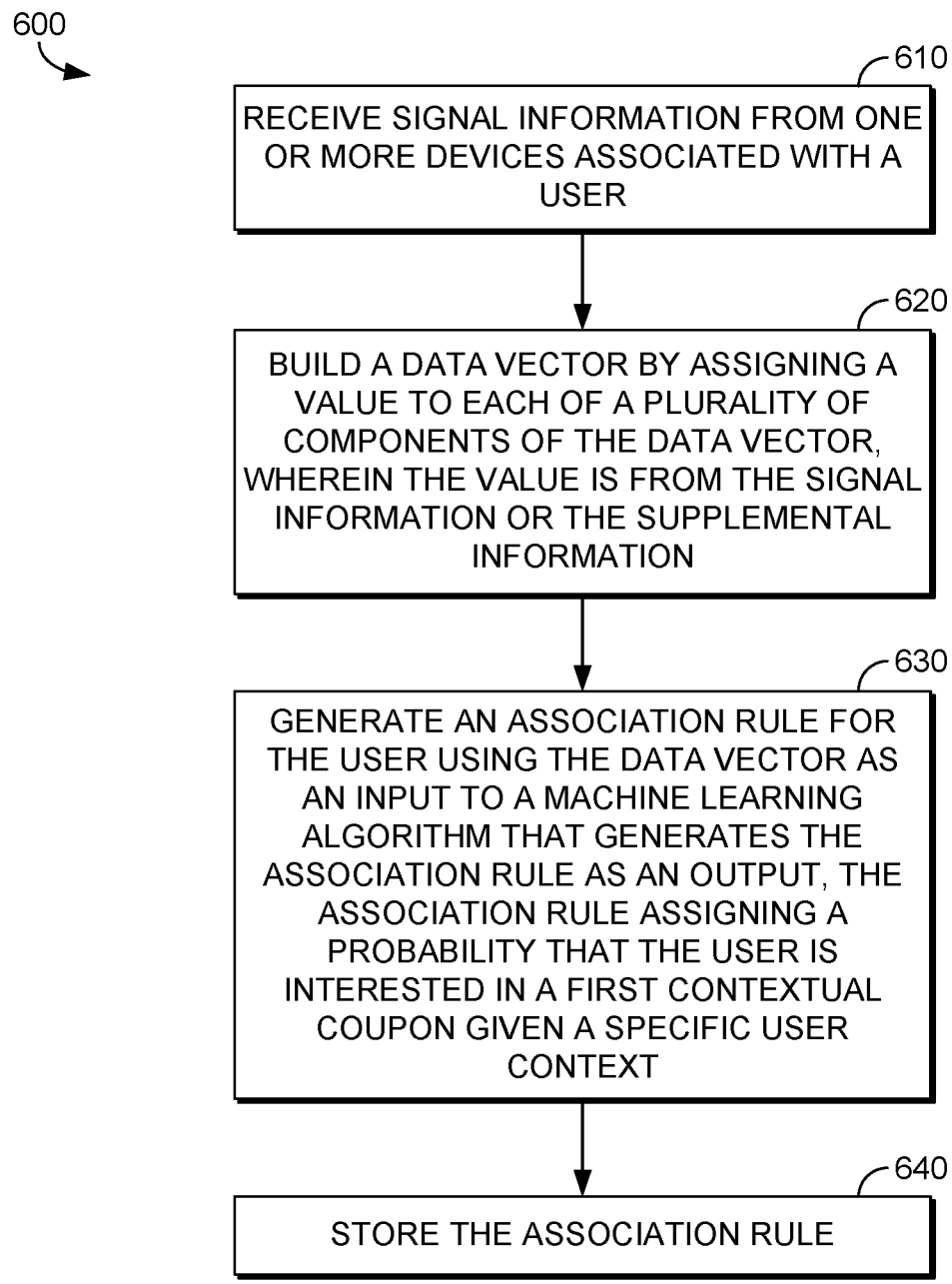
FIG. 6 is a diagram depicting a method of generating a coupon recommendation, in accordance with an aspect of the technology described herein.

Turning now to FIG. 6, a method 600 of generating user-specific contextual association rules for coupons is shown. Method 600 may be performed on a server located within a data center, for example, by coupon engine 280. At step 610, signal information from one or more devices associated with a user is received. The signal data may be received from multiple user devices including smartphones, smart watches, smart glasses, tablets, laptops, PCs, and other computing devices. In addition, signal data may be received from one or more online services such as video services, music services, shopping services, social networks, email services, and others. The signal information can include data describing the event as well as data describing other events or no events. Initially, data associated with a specific event can be identified using an event classification system. In one aspect, the signal data includes use or rejection of coupons received previously. The rejection may be implicit or explicit. An explicit rejection can be provided through a coupon interface that provides a feedback mechanism for the user to reject a coupon. An implicit rejection occurs when the user does not use a coupon provided to the user. The user's rejection of a coupon qualifies as an event as "events" are described herein.

At step 620, a data vector is built by assigning a value to each of a plurality of components of the data vector. The value is from the signal information or the supplemental information. Different types of algorithms can be used to generate the association rule using the data vectors as input. Exemplary algorithms include, but are not limited to: Multi-Relation Association Rules, Context Based Association Rules, weighted class learning, High-order pattern discovery, K-optimal pattern discovery, Approximate Frequent Itemset mining, Generalized Association Rules hierarchical taxonomy (concept hierarchy), Quantitative Association Rules, Interval Data Association Rules, Maximal Association Rules, Sequential pattern mining, and Sequential Rules.

At step 630, an association rule for the user is generated using the data vector as an input to a machine learning algorithm that generates the association rule as an output. The association rule assigns a probability that the user is interested in a contextual coupon given a specific user context.

The association rule can be a multivariable association rule where the context is defined with multiple parameters, such as time, location, day, companions, recent activities, etc. In this way, the association rule represents a user behavior pattern where past context and past behaviors are mapped to a current context and a coupon related to the past behavior.

At step 640, the association rule is stored. In one aspect, only association rules with above a threshold correlation between the context and the coupon are stored.

Once an association rule is generated and stored, it can be used to present a coupon to the user when a given context occurs. In one aspect, additional signal information is received from the user device associated with the user. As a single information is received, the context of the user may be determined. The context can be defined by the user's location, time of day, and what the user is doing, among other factors. The present context of the user can be determined to match the context in one or more association rules. When the context matches multiple association rules and the probabilities associated with the coupon, the rules can be ranked, along with other factors, to determine which coupon is provided. When the context matches a single rule, then the coupon may be presented to the user. As mentioned, the coupon may be presented as a visual indication on a display associated with the computing device, audibly, or through some other method.

In one aspect, a method 800 of using a coupon status to disambiguate a user's location is provided. In some situations, a user's location within one of several nearby venues can be ambiguous when they are located closely together. For example, it may be difficult to tell which of several nearby stores within a mall a user is actually in. The technology can use active coupons on a user system as a disambiguating signal. As mentioned, a user device, such as a smartphone, may receive a plurality of coupon scenarios. An application on the user device, such as a web browser or personal assistant application, can monitor the context of the user in the user device to determine when the trigger criteria associated with a coupon scenario is satisfied. The active coupon scenarios reflect a present shopping interest of the user. In one aspect, a user device can store both active and inactive coupon scenarios. For example, a coupon scenario related to purchasing running shoes may be deactivated after the user actually purchases running shoes and reactivated several months later when the user is more likely to purchase a new pair of running shoes. Let's assume, for the sake of example, that the running shoe coupon scenario is deactivated and a new cell phone coupon scenario is active. Location data indicating that the user is near both an electronics store and an athletic shoe store could be used to determine the user is in the electronics store. Various scenarios can then be driven based on this location determination.

At step 810, signal information describing a present physical context of a computing device associated with a user is received. The physical context comprises a location of the computing device. The location information could be provided by a GPS signal or some other method. At step 820, multiple venues are determined to be associated with the location. At step 830, an active coupon scenario on the computing device is determined to be for a shopping item available at a specific venue of the one or more venues. The active coupon scenario is being monitored for satisfaction of a triggering criteria that is not satisfied by the present physical context. At step 840, the specific venue is assigned as a present location of the computing device. The venue can be a retail outlet in one aspect.

Exemplary Operating Environment

Figure 7:
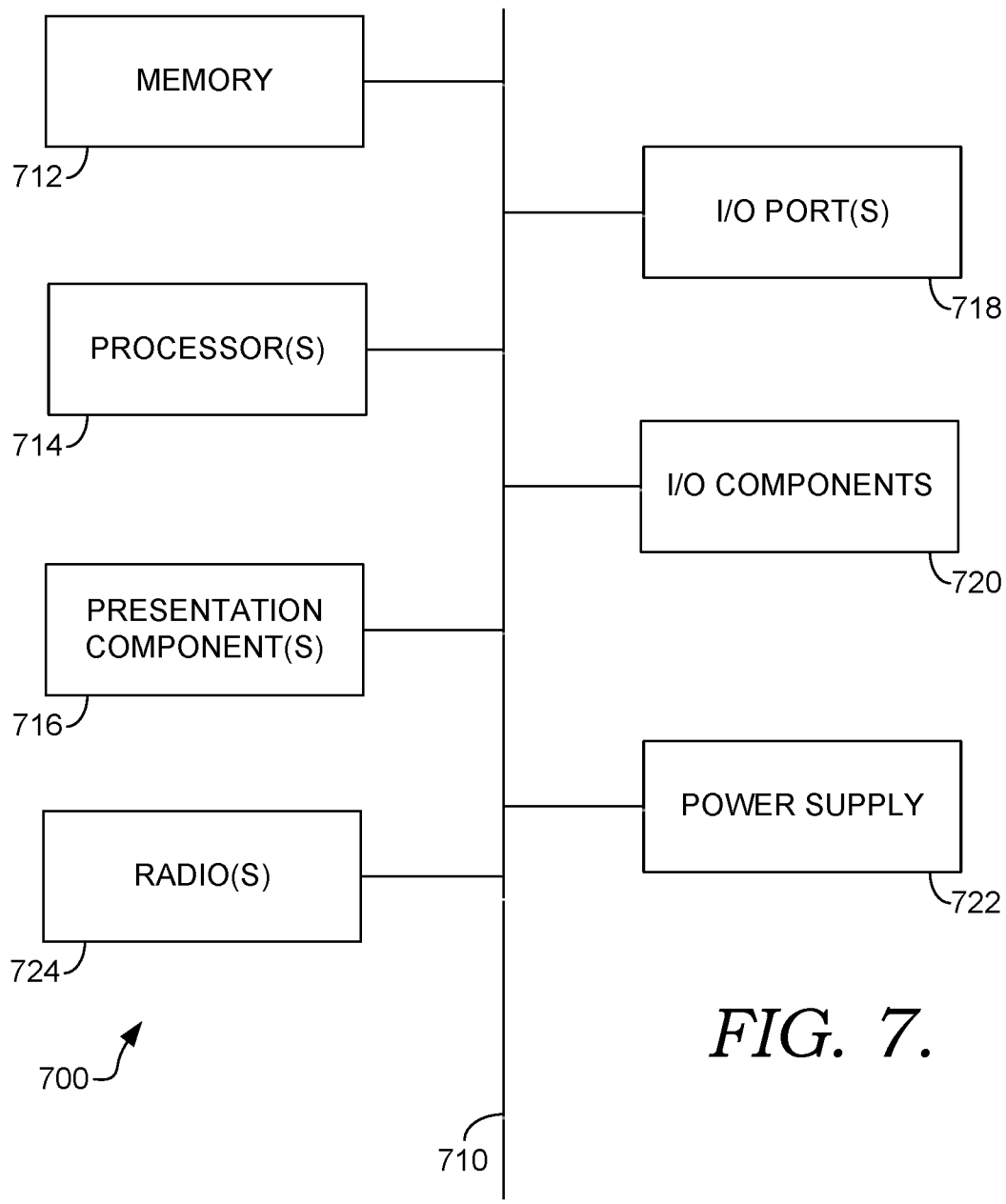
FIG. 7 is a block diagram of an exemplary computing environment suitable for implementing aspects of the technology described herein.
Figure 8:
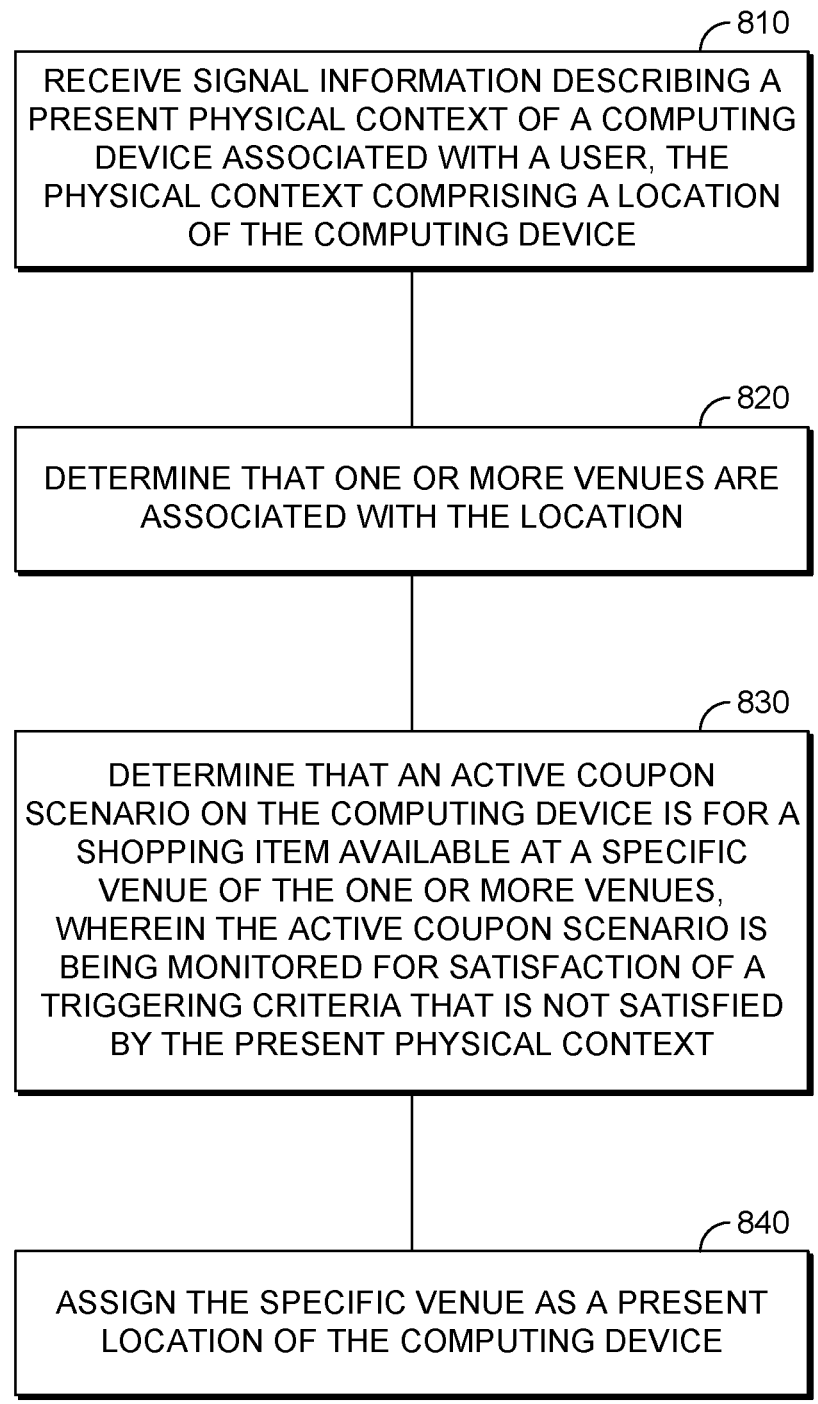
FIG. 8 is a diagram depicting a method of disambiguating a user's location, in accordance with an aspect of the technology described herein.

Referring to the drawings in general, and initially to FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separate from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio. The radio transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short"

and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
a processor; and
computer storage memory having computer-executable instructions stored thereon which, when executed by the processor, implement a method of generating user-specific contextual association rules, the method comprising:
analyzing signal information associated with a computing device to determine a shopping event of a first type has occurred, the computing device being associated with a user;
classifying the shopping event as routine or non-routine based on user event history data, wherein an event that is dissimilar to other events in the user event history data is classified as non-routine;
building a data vector for the shopping event by assigning a value to a plurality of components of the data vector using information derived from the signal information, wherein a component of the plurality of components indicates the routine or non-routine classification;
generating an association rule for the first type of event using the data vector as an input to a machine learning algorithm that generates the association rule as an output, the association rule assigning a probability that the user is interested in a specific shopping item given a specific user context, the specific user context comprising at least one of a day, a time, or a location;
storing the association rule that comprises the specific shopping item and the specific user context;
matching the specific shopping item to a coupon for the specific shopping item;
generating a coupon scenario that comprises the coupon for the specific shopping item and a trigger criteria for the specific user context, wherein the trigger criteria corresponds to signal information associated with the computing device, and wherein a match between the trigger criteria and a present context associated with the computing device triggers a presentation of the coupon; and
distributing the coupon scenario to an application running on a user device.

2. The system of claim 1, wherein the shopping event is the user eating at a restaurant and the plurality of components of the data vector comprises a user location, a time at which the user was at the restaurant, and a food type served by the restaurant.

3. The system of claim 1, wherein the method further comprises enhancing the signal information by identifying an entity within the signal information and retrieving supplemental information about the entity from a knowledge base.

4. The system of claim 3, wherein the knowledge base comprises information about the user that is collected, at least in part, by a personal assistant application running on the computing device.

5. A computing system comprising:
a processor; and
computer storage memory having computer-executable instructions stored thereon which, when executed by the processor, implement a method of generating user-specific contextual association rules, the method comprising:
analyzing signal information associated with a computing device to determine a shopping event of a first type has occurred, the computing device being associated with a user;
classifying the shopping event as routine or non-routine based on a similarity or dissimilarity to other events in user event history data;
building a data vector for the shopping event by assigning a value to a plurality of components of the data vector using information derived from the signal information, wherein a component of the plurality of components indicates the routine or non-routine classification;
generating an association rule for the first type of event using the data vector as an input to a machine learning algorithm that generates the association rule as an output, the association rule assigning a probability that the user is interested in a specific shopping item given a specific user context, the specific user context comprising at least one of a day, a time, or a location;
storing the association rule that comprises the specific shopping item and the specific user context;
matching the specific shopping item to a coupon for the specific shopping item;
generating a coupon scenario that comprises the coupon for the specific shopping item and a trigger criteria for the specific user context, wherein the trigger criteria corresponds to signal information associated with the computing device, and wherein a match between the trigger criteria and a present context associated with the computing device triggers a presentation of the coupon; and
distributing the coupon scenario to a personal assistant application running on a user device.

6. The system of claim 5, wherein the shopping event is the user watching a movie in a theater and the plurality of components of the data vector comprises a theater location, a movie time, and a genre of the movie.

7. The system of claim 5, wherein the shopping event is the user purchasing a movie online and the plurality of components of the data vector comprises a user location, a movie time, and a source of the movie.

8. The system of claim 5, wherein the coupon includes show times for one or more movies showing at a movie theater within a threshold distance of the location indicated by the specific user context.

9. The system of claim 5, wherein the shopping event is the user eating at a restaurant and the plurality of components of the data vector comprises a user location, a time at which the user was at the restaurant, and a food type served by the restaurant.

10. The system of claim 5, wherein the method further comprises enhancing the signal information by identifying an entity within the signal information and retrieving supplemental information about the entity from a knowledge base.

11. The system of claim 10, wherein the knowledge base comprises information about the user that is collected, at least in part, by the personal assistant application.

12. A computer-implemented method comprising:
determining a shopping event of a first type has occurred based on signal information received from a computing device associated with a user;
classifying the shopping event as routine or non-routine;
building a data vector for the shopping event, the data vector comprising data derived from the signal information, wherein a component of the data vector indicates the routine or non-routine classification;
providing the data vector as input to a machine learning algorithm and receiving as output an association rule for the first type of event, the association rule comprising a probability that the user is interested in a shopping item given a specific user context, the specific user context comprising at least one of a day, a time, or a location;
at a processor, generating a coupon scenario that comprises a coupon for the shopping item and a trigger criteria corresponding to the specific user context, wherein a presentation of the coupon is triggered by a present context associated with the computing device satisfying the trigger criteria; and
providing the coupon scenario to an application at the computing device.

13. The method of claim 12, wherein the specific user context comprises the location and the location comprises a virtual location.

14. The method of claim 12, wherein the shopping event is classified as routine or non-routine based on analyzing a location of the shopping event with respect to a home geographic area for the user.

15. The method of claim 12, wherein the data vector comprises a component identifying a companion who participated in the shopping event with the user based on analyzing social network data for the user and the companion.

16. The method of claim 12, wherein the application comprises a web browser application and the coupon is provided for presentation at a coupon interface of the web browser application, and wherein the coupon interface is separate from a webpage presentation area provided by the web browser application.

17. The method of claim 14, further comprising classifying the shopping event as non-routine based on the location of the shopping event being outside of the home geographic area for the user.

18. The method of claim 12, further comprising classifying the shopping event as non-routine based on the shopping event being dissimilar to other events in user event history data.

19. The method of claim 12, further comprising changing the classification of the shopping event as routine or non-routine based on gathering additional data over time.

20. The method of claim 12, further comprising generating a non-routine association rule based on data vectors indicating a non-routine classification and utilizing the non-routine association rule when the specific user context comprises a non-routine context.

* * * * *